(12) United States Patent
Benco et al.

(10) Patent No.: US 7,062,256 B2
(45) Date of Patent: Jun. 13, 2006

(54) NETWORK SUPPORTED NEW FEATURE NOTIFICATION AND TRIAL

(75) Inventors: David S. Benco, Winfield, IL (US);
Kevin J. Overend, Elmhurst, IL (US);
Baoling S. Sheen, Naperville, IL (US);
Sandra L. True, St. Charles, IL (US);
Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 349 days.

(21) Appl. No.: 10/687,447

(22) Filed: Oct. 16, 2003

(65) Prior Publication Data

US 2005/0085220 A1    Apr. 21, 2005

(51) Int. Cl.
*H04Q 7/20*    (2006.01)
*H04Q 7/38*    (2006.01)
*H04Q 2/22*    (2006.01)
*H04M 3/00*    (2006.01)
*H04M 1/00*    (2006.01)
*H04B 1/38*    (2006.01)

(52) U.S. Cl. ............................ 455/412.2; 455/412.1; 455/414.1; 455/418; 455/432.3; 455/433; 455/466; 455/550.1; 455/560

(58) Field of Classification Search .. 455/412.1–412.2, 455/414.1, 414.2, 418–420, 466, 560–561, 455/550.1, 556.1, 556.2, 557, 566–567, 426.2, 455/433, 432.3, 458, 517, 61, 3.06, 413, 455/414.3; 705/28, 30, 404, 22, 402; 709/203, 709/201, 218–219, 221–222, 206, 228–229; 370/268, 270, 271, 312–313
See application file for complete search history.

(56) References Cited

U.S. PATENT DOCUMENTS

| 5,903,832 | A | * | 5/1999 | Seppanen et al. ......... 455/435.3 |
| 2002/0123336 | A1 | * | 9/2002 | Kamada ..................... 455/420 |
| 2003/0186689 | A1 | * | 10/2003 | Herle et al. ................. 455/418 |
| 2004/0110494 | A1 | * | 6/2004 | Cohen et al. ............. 455/414.1 |
| 2004/0203686 | A1 | * | 10/2004 | Bahr .......................... 455/418 |
| 2005/0064884 | A1 | * | 3/2005 | Dumont et al. ............. 455/466 |

* cited by examiner

Primary Examiner—William Trost
Assistant Examiner—Meless Zewdu

(57) ABSTRACT

In general terms one embodiment of the present system and method is for a network to send a notification to subscribers regarding a new feature introduction. The method may have the steps of: generating a notification message regarding a new feature; sending the notification message to at least one mobile subscriber; sending a response to the network that indicates that the at least one mobile subscriber desires to try the new feature; storing the new feature with an expiration time in a subscriber database; detecting, by the network, an end of the expiration time for the at least one mobile subscriber; and sending, by the network, a feature expiration notification message to the at least one mobile subscriber regarding subscribing to the new feature. The system implements the method.

8 Claims, 2 Drawing Sheets

NETWORK SUPPORTED NEW FEATURE NOTIFICATION AND TRIAL

TECHNICAL FIELD

The present invention relates to wireless telephony in general, and, more particularly, to embodiments of a method and system that provide for a network to send a notification to subscribers regarding a new feature introduction.

BACKGROUND OF THE INVENTION

Wireless communication systems are constantly evolving. System designers are continually developing greater numbers of features for both service providers as well as for the end users. In the area of wireless phone systems, cellular based phone systems have advanced tremendously in recent years. Wireless phone systems are available based on a variety of modulation techniques and are capable of using a number of allocated frequency bands. Available modulation schemes include analog FM and digital modulation schemes using Time Division Multiple Access (TDMA) or Code Division Multiple Access (CDMA). Each scheme has inherent advantages and disadvantages relating to system architecture, frequency reuse, and communications quality. However, the features the manufacturer offers to the service provider and which the service provider offers to the consumer are similar between the different wireless systems.

Regardless of the modulation scheme in use, the wireless phone available to the end user has myriad features implemented. Nearly all wireless phones incorporate a display that allows the user to enter text banners, display dialed numbers, and display incoming caller numbers. Additionally, wireless phones may incorporate electronic phonebooks, speed dialing, single button voicemail access, and messaging capabilities.

The features described above present only a sample of features that are capable of, or have already been, implemented into wireless phone systems. Any individual feature is capable of implementation into some or all of the wireless systems using the modulation schemes mentioned above. A particularly useful feature provides messaging capability within phones. The Short Message Services (SMS) feature used in a CDMA wireless communication system allows for information transfer to and from a wireless phone. However, the implementation of SMS is not limited to use in a CDMA system. The description of SMS in a CDMA system is merely provided as a foundation for the discussion of the preferred embodiment of the invention presented below. Short Message Services (SMS) are used to allow the communication of alphanumeric messages to wireless phones.

However, the multitude of features available on any particular wireless communication system presents problems to the service provider. The service provider may not choose to initially enable all features. The service provider may also choose to implement new features as they are developed. Subscriber units are initialized with features matching those offered by the service provider even though the phone may be capable of supporting additional features. Unfortunately, when the service provider activates new features, the phone must be manually updated to activate the additional feature. The manual update is either performed by requiring the user to return the subscriber unit to the service provider for update or by instructing the user to activate the feature through a series of keypad entries. Requiring the user to return the subscriber unit to the service provider for update is extremely inconvenient to the user and may result in many phones not having the feature activated. Similar problems exist when requiring the user to activate the feature through keypad entries. The user is instructed in how to access a protected service menu within the phone software and is provided directions in how to activate the feature. The user may never receive the instructions or, if the user is technologically unsophisticated, may be hesitant to attempt to activate the feature.

Thus, there is a need for systems that overcome the problem of mobile subscribers who are not aware of new features that may be introduced/added in their service provider's network. Many subscribers may only become aware of new features if they go to their service provider's store or some sales representative calls them regarding a new feature.

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

In general terms one embodiment of the present method is for a network to send a notification to subscribers regarding a new feature introduction, comprising the steps of: generating a notification message regarding a new feature; sending the notification message to at least one mobile subscriber; sending a response to the network that indicates that the at least one mobile subscriber desires to try the new feature; storing the new feature with an expiration time in a subscriber database; detecting, by the network, an end of the expiration time for the at least one mobile subscriber; and sending, by the network, a feature expiration notification message to the at least one mobile subscriber regarding subscribing to the new feature.

In general terms one embodiment of the present system is for notification by a network to mobile subscribers regarding a new feature, comprising: a notification message regarding a new feature introduction by the network, the notification message offering the new feature for a trial time period to at least one mobile subscriber; a response that indicates that the at least one mobile subscriber desires to try the new feature; a subscriber database in which is stored an expiration time for the trial time period; and a feature expiration notification message containing an offer to subscribe to the new feature; wherein, when the network detects an end of the expiration time of the trial time period for the at least one mobile subscriber, the network sends the feature expiration notification message to the at least one mobile subscriber.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate an embodiment of the present invention and are not intended to limit the scope of the invention.

A general embodiment of the present method may provide for notification by a network to mobile subscribers regarding a new feature. According to the methodology the network sends a notification to subscribers informing them of a new feature introduction. Embodiments of the present system and method may be a methodology for the network to offer subscribers free trials of a new feature for a certain period of time. Other embodiments of the present system and method may be a methodology for the network to activate a new feature for a subscriber for a defined period of time if the subscriber elects to try the new feature.

Further embodiments of the present system and method may be a methodology for the network to detect the expiration of the trial offer and send a message to notify the subscriber of the feature expiration. A further methodology for the network of the present system and method may be to permanently activate the new feature for the subscriber based on a response by the subscriber.

In general terms in one embodiment of the present method and system, a notification message regarding a new feature is introduced by the network, the notification message offering the new feature for a trial time period to at least one mobile subscriber. A response by the mobile subscriber may indicate that the at least one mobile subscriber desires to try the new feature. An expiration time for the trial time period may be stored in a subscriber database. When the network detects an end of the expiration time of the trial time period for the at least one mobile subscriber, the network may send a feature expiration notification message to the at least one mobile subscriber. The feature expiration notification message may contain an offer to subscribe to the new feature.

Thus embodiments of the present system and method may provide the capability for the network to offer subscribers a trial for the new feature. Embodiments of the present system and method may also provide the capability for the network to activate the new feature if the subscriber elects to try the new feature. Furthermore, embodiments of the present system and method may provide the capability for the network to automatically detect the expiration of the trial offer and either send a new message to the subscriber or deactivate the feature from the subscriber's database.

Figure 1:
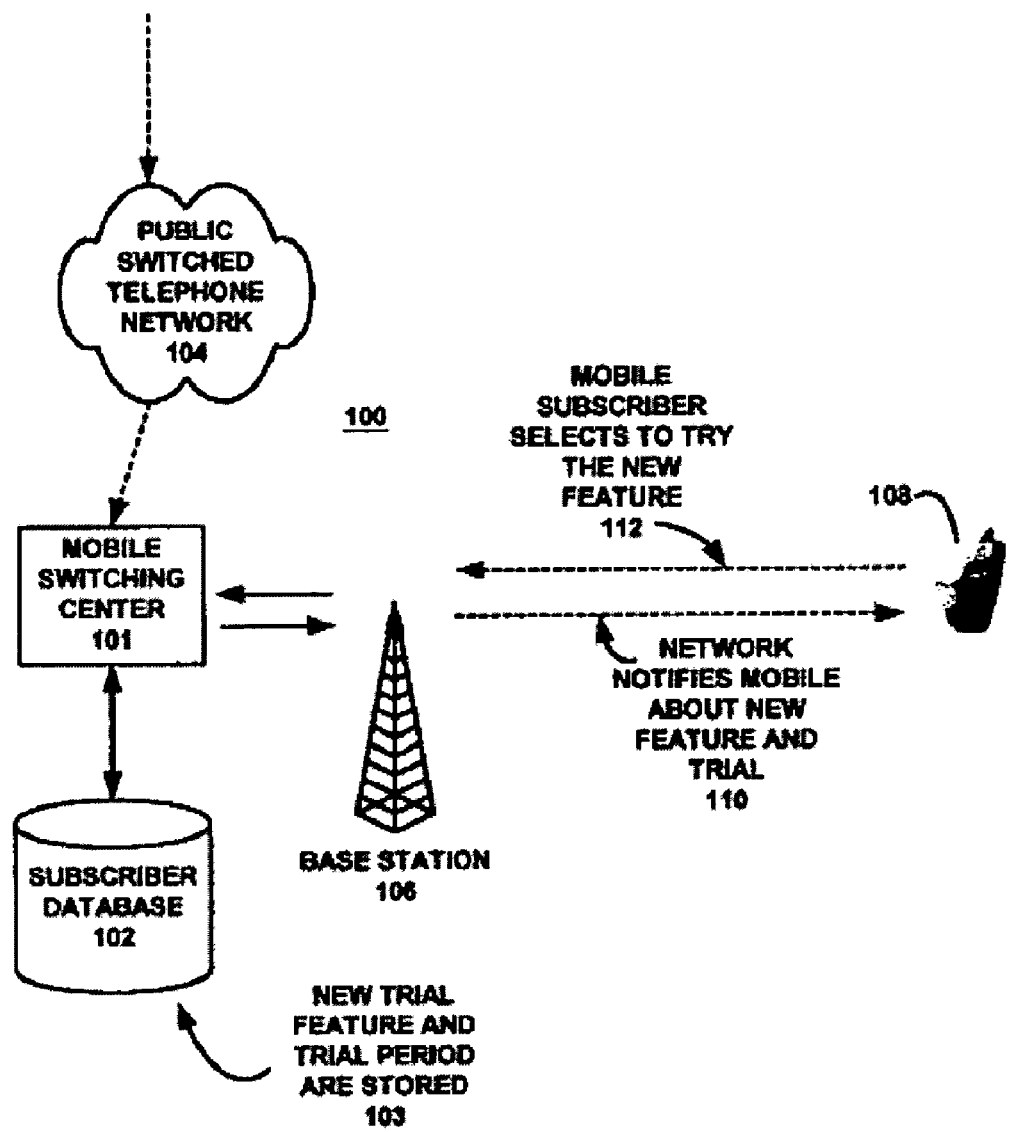
FIG. 1 depicts a block diagram illustrative of one embodiment of the present system.

Reference is now made to FIG. 1 wherein there is shown an exemplary wireless network 100. A public switched telephone network (PSTN) 104 is operatively connected to a mobile switching center (MSC) 101. The MSC 101 is in communication with at least one base station 106. The base station 106 is the physical equipment, illustrated for simplicity as a radio tower, which provides radio coverage to the geographical part of a cell for which it is responsible. The base station 106 may be in communication with mobile stations, such as mobile station 108 (also referred to as a mobile subscriber).

With further reference to FIG. 1, a subscriber database 102 may contain a home location register, which is a database maintaining and storing subscriber information such as subscriber profiles, current location information, international mobile subscriber Identity numbers, and other administrative information. The subscriber services associated with the mobile station 108 are defined in a subscriber profile that may be stored in the home location register in the subscriber database 102. The home location register may be co-located with a given MSC 101, integrated with the MSC 101, or alternatively service multiple MSCs. The subscriber database may also include a visitor location register that has information about all of the mobile stations currently located within an area of the base station 106.

The mobile station 108 may consist of the mobile equipment (the terminal) and a smart card called the subscriber identity module (SIM). The SIM provides personal mobility, so that the user can have access to subscribed services irrespective of a specific terminal. By inserting the SIM card into another GSM terminal, the user is able to receive calls at that terminal, make calls from that terminal, and receive other subscribed services.

The mobile equipment is uniquely identified by the international mobile equipment identity (IMEI). The SIM card contains the international mobile subscriber identity (IMSI) used to identify the subscriber to the system, a secret key for authentication, and other information. The IMEI and the IMSI are independent, thereby allowing personal mobility. The SIM card may be protected against unauthorized use by a password or personal identity number.

The base station 106 may be composed of two parts, the base transceiver station (BTS) and the base station controller (BSC). These communicate across the standardized Abis interface, allowing (as in the rest of the system) operation between components made by different suppliers.

The base transceiver station houses the radio transceivers that define a cell and handles the radio-link protocols with the mobile station. The base station controller manages the radio resources for one or more base transceiver stations. It handles radio-channel setup, frequency hopping, and handovers, as described below. The base station controller is the connection between the mobile station 108 and the mobile switching center 101 (MSC).

The mobile switching center 101 (MSC) acts like a normal switching node of the PSTN 104 or ISDN (not shown), and additionally provides all the functionality needed to handle a mobile subscriber 108, such as registration, authentication, location updating, handovers, and call routing to a roaming subscriber. These services are provided in conjunction with several functional entities.

The home location register (HLR) and visitor location register (VLR) in the subscriber database 102, together with the MSC 101, provide the call-routing and roaming capabilities of system. The HLR contains all the administrative information of each subscriber registered in the corresponding network, along with the current location of the mobile subscriber 108. The location of the mobile subscriber 108 is typically in the form of the signaling address of the VLR associated with the mobile station 108.

The visitor location register (VLR) in the subscriber database 102, contains selected administrative information from the HLR, necessary for call control and provision of the subscribed services, for each mobile station 108 currently located in the geographical area controlled by the VLR. Although each functional entity can be implemented as an independent unit, all manufacturers of switching equipment to date implement the VLR together with the MSC 101, so that the geographical area controlled by the MSC 101 corresponds to that controlled by the VLR, thus simplifying the signaling required. Note that the MSC contains no information about particular mobile stations, which information is stored in the location registers.

One of the embodiments of the present method that is depicted in FIG. 1 provides for a network to send a notification (110) to mobile subscribers, such as mobile subscriber 108, regarding a new feature (103) in the network.

Figure 2:
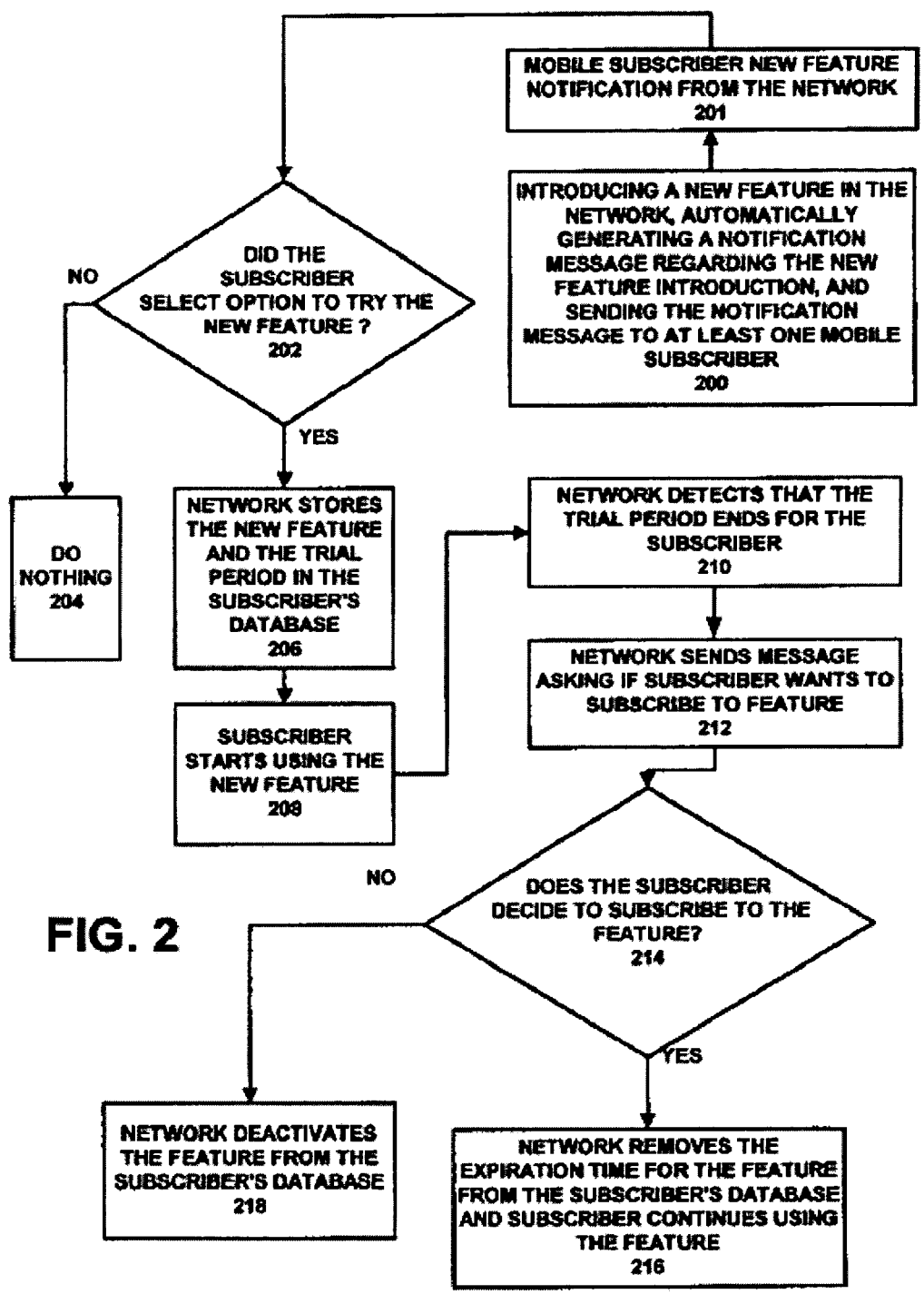
FIG. 2 illustrates a very general flow chart of logical operational steps that may be followed in accordance with one embodiment of the present method.

The mobile subscriber 108 may reply with a response 112. The network may include the mobile switching center 101 with its subscriber database 102 and base station 106, as well as other elements. This embodiment (also see FIG. 2) has the steps of: introducing a new feature in the network, automatically generating a notification message regarding the new feature introduction, and sending the notification message to at least one mobile subscriber 108 (step 200), the notification message offering the new feature for a trial time period (step 201); sending a response to the network that indicates that the at least one mobile subscriber desires to try the new feature (step 202); storing the new feature with an expiration time for the trial time period in a subscriber database (step 206); using the new feature by the subscriber (step 208): doing nothing if the subscriber did not elect to use the new feature (step 204); detecting, by the network, an end of the expiration time of the trial time period for the at least one mobile subscriber (step 210); and sending, by the network, a feature expiration notification message to the at least one mobile subscriber, the feature expiration notification message containing an offer to subscribe to the new feature (step 212).

The feature expiration notification message may be sent to the at least one mobile subscriber in at least one of a form of Short Message Service, a form for a display on a mobile device of the at least one subscriber, and voice mail for the at least one subscriber.

In a further embodiment the method may have additional steps of: electing, by the at least one mobile subscriber, to subscribe to the new feature (step 214); sending, by the at least one mobile subscribe, a feature election message to the network, and removing, by the network, from the subscriber database the expiration time for the new feature (step 216). The sending of the feature election message to the network may be effected by pressing a soft key from a wireless device of the at least one mobile subscriber and responding to the feature expiration notification message with a "yes" answer.

In another further embodiment the method may have additional steps of: electing, by the at least one mobile subscriber, not to subscribe to the new feature; at least one of not responding, by the at least one mobile subscriber, to the feature expiration notification message and sending, by the at least one mobile subscribe, a feature non-election message to the network (step 214); and deactivating, by the network, the new feature from the subscriber database (step 218). The sending of the feature non-election message to the network may be effected by pressing a soft key from a wireless device of the at least one mobile subscriber and responding to the feature expiration notification message with a "no" answer.

In one embodiment of a typical scenario, when the service provider implements a new feature and decides to offer this feature as a trial to its subscribers, the network generates a notification message about this new feature including information about the free trial time period. The network then sends this message to mobile subscribers in the form of Short Message Service (SMS), or by other alternative methods, e.g. display on the mobile device, voice mail, etc.

The subscriber receives the message and may decide to try this new feature. The subscriber indicates the election by, for example, either pressing a soft key on the wireless device or responding to the message with a "yes" answer. The new feature with the expiration time is then stored in the subscriber database.

The network detects the end of the free trial period for the subscriber and sends a feature expiration notification message to the subscriber asking if the subscriber would like to subscribe to the feature. If the subscriber selects the option to subscribe to the feature, then the network may remove the expiration time of the feature from the subscriber's database. If the subscriber decides not to subscribe to the feature, then the network deactivates the feature from the subscriber's database.

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skilled in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

We claim:

1. A method for a network to send a notification to subscribers regarding a new feature introduction, comprising the steps of:
   generating a notification message regarding a new feature;
   sending the notification message to at least one mobile subscriber;
   sending a response to the network that indicates that the at least one mobile subscriber desires to try the new feature;
   storing the new feature with an expiration time in a subscriber database;
   electing, by the at least one mobile subscriber, to subscribe to the new feature;
   sending, by the at least one mobile subscribe, a feature election message to the network;
   responding to the feature expiration notification message with an affirmative answer;
   removing, by the network, from the subscriber database the expiration time for the new feature.

2. The method according to claim 1, wherein the generating of a notification message regarding the new feature occurs automatically in response to the introduction of the new feature in the network.

3. The method according to claim 1, wherein the feature expiration notification message is sent to the at least one mobile subscriber in at least one of a form of Short Message Service, a form for a display on a mobile device of the at least one subscriber, and voice mail for the at least one subscriber.

4. A method for a network to send a notification to subscribers regarding a new feature introduction, comprising the steps of:
- generating a notification message regarding a new feature;
- sending the notification message to at least one mobile subscriber;
- sending a response to the network that indicates that the at least one mobile subscriber desires to try the new feature, the at least one mobile subscriber electing to subscribe to the new feature and the at least one mobile subscribe sending a feature election message, as the response, to the network;
- storing the new feature with an expiration time in a subscriber database;
- detecting, by the network, an end of the expiration time for the at least one mobile subscriber; and
- sending, by the network, a feature expiration notification message to the at least one mobile subscriber regarding subscribing to the new feature and removing, by the network, from the subscriber database the expiration time for the new feature;
- the sending of the feature election message to the network being effected by pressing a soft key from a wireless device of the at least one mobile subscriber and responding to the feature expiration notification message with a "yes" answer.

5. A method for a network to send a notification to mobile subscribers regarding a new feature in the network, comprising the steps of:
- introducing a new feature in the network;
- automatically generating a notification message regarding the new feature introduction;
- sending the notification message to at least one mobile subscriber, the notification message offering the new feature for a trial time period;
- electing, by the at least one mobile subscriber, to subscribe to the new feature;
- sending, by the at least one mobile subscribe, a feature election message to the network, the sending of the feature election message to the network being effected by pressing a soft key from a wireless device of the at least one mobile subscriber and responding to the feature expiration notification message with a "yes" answer;
- storing the new feature with an expiration time for the trial time period in a subscriber database;
- detecting, by the network, an end of the expiration time of the trial time period for the at least one mobile subscriber; and
- sending, by the network a feature expiration notification message to the at least one mobile subscriber, the feature expiration notification message containing an offer to subscribe to the new feature; and
- removing, by the network, from the subscriber database the expiration time for the new feature.

6. A system for notification by a network to mobile subscribers regarding a new feature, comprising;
- a notification message offering the new feature introduction by the network, the notification message offering the new feature for a trial time period to at least one mobile subscriber, the feature expiration notification message being sent to the at least one mobile subscriber in at least one of a form of Short Message Service, a form for a display on a mobile device of the at least one subscriber, and voice mail for the at least one subscriber;
- a response that indicates that the at least one mobile subscriber desires to try the new feature, the response being a feature election message, and the sending of the feature election message to the network being effected by pressing a soft key from a wireless device of the at least one mobile subscriber;
- a subscriber database in which is stored an expiration time for the trial time period; and
- a feature expiration notification message containing an offer to subscribe to the new feature, the at least one mobile subscriber responding to the feature expiration notification message with a "yes" answer;
- wherein, when the network detects an end of the expiration time of the trial time period for the at least one mobile subscriber, the network sends the feature expiration notification message to the at least one mobile subscriber;
- wherein, when the at least one mobile subscriber elects to subscribe to the new feature, a feature election message is sent to the network by the at least one mobile subscriber; and wherein the network removes from the subscriber database the expiration time for the new feature.

7. A system for notification by a network to mobile subscribers regarding a new feature, comprising:
- a notification message regarding a new feature introduction by the network, the notification message offering the new feature for a trial time period to at least one mobile subscriber;
- a response that indicates that the at least one mobile subscriber desires to try the new feature;
- a subscriber database in which is stored an expiration time for the trial time period; and
- a feature expiration notification message containing an offer to subscribe to the new feature, the feature expiration notification message is sent to the at least one mobile subscriber in at least one of a form of Short Message Service, a form for a display on a mobile device of the at least one subscriber, and voice mail for the at least one subscriber;
- wherein, when the network detects an end of the expiration time of the trial time period for the at least one mobile subscriber, the network sends the feature expiration notification message to the at least one mobile subscriber; and
- wherein, when the at least one mobile subscriber elects not to subscribe to the new feature, the network deactivates the new feature in the subscriber database in response to at least one of: not responding, by the at least one mobile subscriber, to the feature expiration notification message; and sending, by the at least one mobile subscribe, a feature non-election message to the network.

8. The system according to claim 7, wherein the sending of the feature non-election message to the network is effected by pressing a soft key from a wireless device of the at least one mobile subscriber and responding to the feature expiration notification message with a "no" answer.

* * * * *